US012247843B2

(12) United States Patent
Jia et al.

(10) Patent No.: US 12,247,843 B2
(45) Date of Patent: Mar. 11, 2025

(54) THREE-DIMENSIONAL PATH DISPLAY METHOD, DEVICE, READABLE STORAGE MEDIUM AND ELECTRONIC APPARATUS

(71) Applicant: Realsee (Beijing) Technology Co., Ltd., Beijing (CN)

(72) Inventors: Songlin Jia, Beijing (CN); Yi Zhu, Beijing (CN); Feng Guo, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 253 days.

(21) Appl. No.: 17/992,298

(22) Filed: Nov. 22, 2022

(65) Prior Publication Data

US 2023/0175858 A1    Jun. 8, 2023

(30) Foreign Application Priority Data

Dec. 7, 2021 (CN) .......................... 202111486747.9

(51) Int. Cl.
*G01C 21/00* (2006.01)
*G06T 17/00* (2006.01)
(Continued)

(52) U.S. Cl.
CPC ........ *G01C 21/3811* (2020.08); *G01C 21/005* (2013.01); *G01C 21/3841* (2020.08);
(Continued)

(58) Field of Classification Search
CPC .............. G01C 21/3811; G01C 21/3841; H04N 13/15; H04N 13/275; H04N 13/324; G06T 19/006
See application file for complete search history.

(56) References Cited

U.S. PATENT DOCUMENTS

2015/0363934 A1\* 12/2015 Ko ........................... G06T 7/73
  701/431
2017/0109932 A1\* 4/2017 Fujimoto ............. H04N 9/3185
(Continued)

FOREIGN PATENT DOCUMENTS

| CN | 110595429 A | 12/2019 |
|---|---|---|
| CN | 111474899 A | 7/2020 |
| CN | 114170381 A | 3/2022 |

OTHER PUBLICATIONS

Patent Cooperation Treaty, International Search Report and Written Opinion, International Application No. PCT/CN2022/136643 (Feb. 21, 2023).

*Primary Examiner* — Roberto Borja
(74) *Attorney, Agent, or Firm* — Leydig, Voit & Mayer, Ltd.

(57) ABSTRACT

Embodiments of the present disclosure disclose a three-dimensional path display method, device, computer-readable storage medium, electronic apparatus and computer program product. Therein the method comprises: determining, from a target three-dimensional space, a first sampling-point set comprising points; based on the first sampling-point set, generating a curve indicating the three-dimensional path to be generated; based on the curve, generating the three-dimensional path comprising a path region set, wherein the three-dimensional path passes through the points of the first sampling-point set; determining a mapping relationship between vertices of respective path regions in the path region set and pixels in a preset two-dimensional picture; according to the mapping relationship, inserting corresponding pixels into path regions in the path region set; and displaying the three-dimensional path after the pixels are inserted.

14 Claims, 6 Drawing Sheets

(51) Int. Cl.
*G06T 19/00* (2011.01)
*H04N 13/15* (2018.01)
*H04N 13/275* (2018.01)
*H04N 13/324* (2018.01)

(52) U.S. Cl.
CPC ............ *G06T 17/00* (2013.01); *G06T 19/006* (2013.01); *H04N 13/15* (2018.05); *H04N 13/275* (2018.05); *H04N 13/324* (2018.05)

(56) References Cited

U.S. PATENT DOCUMENTS

| | | | |
|---|---|---|---|
| 2021/0148713 A1* | 5/2021 | Yu | G01C 21/3632 |
| 2021/0295714 A1 | 9/2021 | Huang | |
| 2022/0042813 A1* | 2/2022 | Ko | G01C 21/3647 |
| 2022/0333945 A1* | 10/2022 | Lin | G01C 21/3676 |

\* cited by examiner

THREE-DIMENSIONAL PATH DISPLAY METHOD, DEVICE, READABLE STORAGE MEDIUM AND ELECTRONIC APPARATUS

CROSS REFERENCE TO RELATED APPLICATIONS

This application claims priority to Chinese Patent Application No. 202111486747.9, filed on Dec. 7, 2021, the contents of which are hereby incorporated by reference in their entirety for all purposes.

FIELD

The present disclosure relates to the field of computer technology, and in particular, to a three-dimensional path display method, device, computer-readable storage medium, computer program product, and electronic apparatus.

BACKGROUND

Dynamic path display refers to a technology that, according to given information of a starting point, an ending point, a passing point, etc., displays a path passing through these points on an electronic map in a visual form.

In solutions of the prior art, if a dynamic path is to be drawn, generally SVG (Scalable Vector Graphics) such as a Bezier curve is used to describe a line path and then a shape of a two-dimensional path can be drawn by setting a line width. However, in a three-dimensional path display, there is currently no mature solution for drawing shapes, and it is usually necessary to draw graphics manually.

SUMMARY

Embodiments of the present disclosure provide a three-dimensional path display method, device, computer-readable storage medium, electronic apparatus, and computer program product.

An embodiment of the present disclosure provides a three-dimensional path display method. The method comprises: determining, from a target three-dimensional space, a first sampling-point set comprising points; based on the first sampling-point set, generating a curve indicating the three-dimensional path to be generated; based on the curve, generating the three-dimensional path comprising a path region set, wherein the three-dimensional path passes through the points of the first sampling-point set; determining a mapping relationship between vertices of respective path regions in the path region set and pixels in a preset two-dimensional picture; according to the mapping relationship, inserting pixels included in a corresponding region in the preset two-dimensional picture into path regions in the path region set; and displaying the three-dimensional path after the pixels are inserted.

In some embodiments, the step of, based on the curve, generating the three-dimensional path comprising the path region set comprises: determining a second sampling-point set from the curve; determining a normal direction of a second sampling point from the second sampling-point set; based on the normal direction, determining a position of a path boundary point corresponding to the second sampling point; and based on obtained respective path boundary points, generating the three-dimensional path comprising the path region set.

In some embodiments, the step of, based on the obtained path boundary points, generating the three-dimensional path comprising the path region set comprises: based on the obtained respective path boundary points, generating a triangular mesh as a path region, and obtaining a three-dimensional path comprising a triangular-mesh set, wherein a region between adjacent second sampling points in the three-dimensional path comprising two triangular meshes with common vertices.

In some embodiments, the step of, based on the normal direction, determining the position of the path boundary point corresponding to the second sampling point comprises: determining a path width corresponding to the second sampling point based on an aspect ratio of the preset two-dimensional picture and a distance between adjacent second sampling points in the second sampling-point set; and based on the path width and the normal direction, determining the position of the path boundary point corresponding to the second sampling point.

In some embodiments, the step of, based on the path width and the normal direction, determining the position of the path boundary point corresponding to the second sampling point further comprises: based on the path width, determining two path boundary points with the same distance from the second sampling point respectively in the normal direction of the second sampling point and an opposite direction of a normal line.

In some embodiments, the step of, based on the curve, generating the three-dimensional path comprising the path region set comprises: based on the aspect ratio of the preset two-dimensional picture, on the curve, generating the three-dimensional path comprising the path region set, wherein the path regions in the path region set are quadrilateral regions.

In some embodiments, the step of determining the mapping relationship between the vertices of respective path regions in the path region set and the pixels in the preset two-dimensional picture comprises: according to a trend of the curve, determining the mapping relationship between the four vertices of respective path regions with quadrilateral shape in the path region set and the corresponding pixels of the four vertices of the preset two-dimensional picture.

In some embodiments, the step of, according to the mapping relationship, inserting the pixels into the path regions in the path region set comprises: for a path region in the path region set, mapping the vertices of the path region to the vertices of the preset two-dimensional picture respectively; based on a correspondence relationship between the vertices of the path region and the vertices of the preset two-dimensional picture, determining a color value of inserted pixel of points in the path region; and based on determined color value, inserting corresponding pixels in the path region.

According to another aspect of embodiments of the present disclosure, a three-dimensional path display device is provided. The device comprises: one or more processors; and a non-transitory computer-readable medium, having computer-executable instructions stored thereon, the computer-executable instructions, when executed by the one or more processor, facilitate: determining, from a target three-dimensional space, a first sampling-point set comprising points; based on the first sampling-point set, generating a curve indicating the three-dimensional path to be generated; based on the curve, generating the three-dimensional path comprising a path region set, wherein the three-dimensional path passes through the points of the first sampling-point set; determining a mapping relationship between vertices of respective path regions in the path region set and pixels in a preset two-dimensional picture; according to the mapping relationship, inserting pixels included in a corresponding region in the preset two-dimensional picture into path regions in the path region set; and displaying the three-dimensional path after the pixels are inserted.

According to another aspect of embodiments of the present disclosure, a non-transitory computer-readable medium is provided. The non-transitory computer-readable medium has computer-executable instructions stored thereon. The computer-executable instructions, when executed by one or more processors executes the above-mentioned three-dimensional path display method.

According to another aspect of embodiments of the present disclosure, an electronic apparatus is provided. The electronic apparatus comprises: a processor; and a memory, configured to store instructions that can be executed by the processor, wherein the processor is configured to read executable instructions from the memory, and execute the instructions so as to implement the above three-dimensional path display method.

According to another aspect of embodiments of the present disclosure, a computer program product is provided. The computer program product comprises a computer program/instruction, and when the computer program/instruction is executed by a processor, the steps of the above three-dimensional path display method are implemented.

Based on the three-dimensional path display method, device, computer-readable storage medium, electronic apparatus, and computer program product provided by the above-mentioned embodiments of the present disclosure, the dynamic generation and display of a three-dimensional path in the three-dimensional scenario is realized by the following means: determining, from a target three-dimensional space, a first sampling-point set; and based on the first sampling-point set, generating a curve of representing the three-dimensional path to be generated; and then based on the curve, generating a three-dimensional path consisting of a path region set; and subsequently determining a mapping relationship between vertices included in respective path regions and pixels in a preset two-dimensional picture; and finally, according to the mapping relationship, inserting corresponding pixels into path regions in the path region set, and displaying the three-dimensional path after the pixels are inserted. As compared with the prior art in which it is necessary to manually draw the three-dimensional path, the embodiments of the present disclosure can greatly improve the efficiency of generating a three-dimensional path, and display the three-dimensional path to the user in real time, thereby improving the efficiency and accuracy of the path display.

Thereinafter, the technical solutions of the present disclosure will be further described in detail through the accompanying drawings and embodiments.

BRIEF DESCRIPTION OF THE DRAWINGS

By describing the embodiments of the present disclosure in more detail in combination with the accompanying drawings, the above and other objects, features and advantages of the present disclosure will become more apparent. The accompanying drawings are used to provide a further understanding of the embodiments of the present disclosure, and constitute a part of the description, and are used to explain the present disclosure together with the embodiments of the present disclosure, which do not limit the present disclosure. In the drawings, the same reference numbers generally refer to the same components or steps.

DESCRIPTION OF THE PREFERRED EMBODIMENTS

Figure 1:
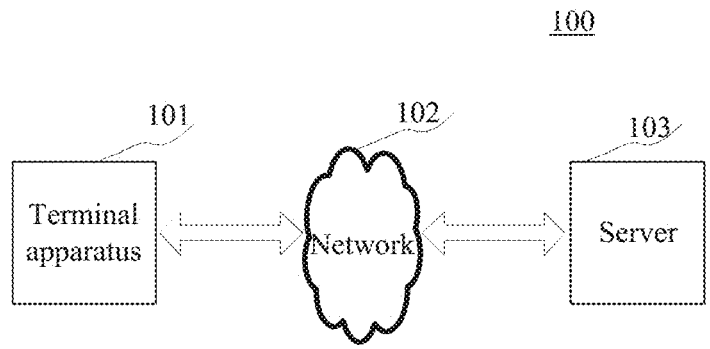
FIG. 1 is a system diagram according to one or more embodiments of the present disclosure.

Hereinafter, exemplary embodiments according to the present disclosure will be described in detail with reference to the accompanying drawings. It should be understood that the described embodiments are only a part of the embodiments of the present disclosure, not all of the embodiments of the present disclosure, and it should be further understood that the present disclosure is not limited by exemplary embodiments described herein.

It should be noted that relative arrangement of the components and steps, numerical expressions and numerical values set forth in these embodiments do not limit the scope of the present disclosure unless specifically stated otherwise.

Those skilled in the art can understand that terms such as "first" and "second" in the embodiments of the present disclosure are only used to distinguish different steps, apparatus, processors, or modules, etc., and neither represent any specific technical meaning, nor represent any the necessary logical order among them.

It should also be understood that, in the embodiments of the present disclosure, "a plurality" may refer to two or more, and "at least one" may refer to one, two or more.

It should also be understood that any component, data or structure mentioned in the embodiments of the present disclosure can generally be understood as one or more in the case of no explicit definition or contrary indications given in the context.

In addition, the term "and/or" in the present disclosure is only an association relationship to describe associated objects, indicating that there can be three types of relationships, for example, A and/or B can mean the following three cases: A exists alone A and B exist at the same time, and B exists alone. In addition, the character "/" in the present disclosure generally indicates that the related objects are an "or" relationship.

It should also be understood that the description of the various embodiments in the present disclosure emphasizes the differences among the various embodiments, and the same or similar points can be referred to each other, and for the sake of brevity, they will not be repeated.

Meanwhile, it should be understood that, for the convenience of description, the dimensions of various parts shown in the accompanying drawings are not drawn in an actual proportional relationship.

The following description of at least one exemplary embodiment is merely illustrative actually and is in no way intended to limit the disclosure, its application or uses in any way.

Techniques, methods, and apparatuses known to those skilled in the art may not be discussed in detail, but where appropriate, such techniques, methods, and apparatuses should be considered part of the description.

It should be noted that similar numerals and letters refer to similar items in the following figures, and thus, once an item is defined in one figure, it does not require further discussion in subsequent figures.

Embodiments of the present disclosure can be applied to electronic apparatuses such as terminal apparatuses, computer systems, servers, etc., which can operate with numerous other general-purpose or special-purpose computing system environments or configurations. Examples of well-known terminal apparatuses, computing systems, environments and/or configurations suitable for use with electronic apparatuses such as terminal apparatuses, computer systems, servers, etc. include, but are not limited to: personal computer systems, server computer systems, thin clients, thick clients, handheld or laptop apparatus, microprocessor-based systems, set-top boxes, programmable consumer electronics, network personal computers, minicomputer systems, mainframe computer systems, and distributed cloud computing technology environments including any of the foregoing systems, etc.

Electronic apparatuses such as terminal apparatuses, computer systems, servers, etc., may be described in the general context of computer-system-executable instructions, such as program modules, being executed by the computer system. Generally, program modules may include routines, programs, object programs, components, logic, data structures, etc. which perform particular tasks or implement particular abstract data types. Computer systems/servers may be implemented in distributed cloud computing environments where tasks are performed by remote processing apparatus that are linked through a communications network. In a distributed cloud computing environment, program modules may be located on a storage media of a local or remote computing system, including storage apparatus.

Application Overview

Currently, in the field of three-dimensional path display, there is no mature solution for drawing shapes, and it is usually necessary to draw graphics manually. As a result, the efficiency of three-dimensional path display is low, and real-time and dynamic path display cannot be realized. The embodiments of the present disclosure aim to solve this problem, that is, according to several three-dimensional points, a three-dimensional path passing through these points can be dynamically drawn.

Exemplary System

FIG. 1 illustrates an exemplary system architecture 100 of a three-dimensional path display method or a three-dimensional path display device to which embodiments of the present disclosure may be applied.

As shown in FIG. 1, the system architecture 100 may include a terminal apparatus 101, a network 102 and a server 103. The network 102 is a medium for providing a communication link between the terminal apparatus 101 and the server 103. The network 102 may include various connection types, such as wired or wireless communication links, fiber optic cables, or the like.

The user can use the terminal apparatus 101 to interact with the server 103 through the network 102 so as to receive or send messages and the like. Various communication client applications may be installed on the terminal apparatus 101, such as navigation applications, electronic map applications, virtual reality applications, augmented reality applications, web browser applications, instant communication tools, and the like.

The terminal apparatus 101 may be various electronic apparatuses, including but not limited to, mobile terminals such as mobile phones, notebook computers, digital broadcast receivers, PDAs (personal digital assistants), PADS (portable android devices), PMPs (portable multimedia players), in-vehicle terminals (for example, vehicle navigation terminals) and the like, and stationary terminals such as digital TVs, desktop computers, and the like.

The server 103 may be a server that provides various services, for example, a background server that provides support for the three-dimensional scenario displayed on the terminal apparatus 101. The background server may generate a three-dimensional path by using a first sampling-point set, and send the three-dimensional path to the terminal apparatus 101, and the terminal apparatus 101 displays the three-dimensional path in a currently real three-dimensional scenario.

It should be noted that the three-dimensional path display method provided by the embodiments of the present disclosure may be executed by the server 103 or by the terminal apparatus 101. Correspondingly, the three-dimensional path display device may be provided in the server 103 or in the terminal apparatus 101. The three-dimensional path display method can further be jointly executed by the terminal apparatus 101 and the server 101 Accordingly, each module included in the three-dimensional path display device can be respectively disposed in the terminal apparatus 101 and the server 103.

It should be understood that the numbers of terminal apparatuses, networks and servers in FIG. 1 are merely illustrative. There can be any number of terminal apparatuses, networks and servers according to implementation needs. For example, in the case that the data representing the three-dimensional space, the first sampling point set, etc. do not need to be obtained remotely, the above-mentioned system architecture may not include a network, but only a server or a terminal apparatus.

Exemplary Method

Figure 2:
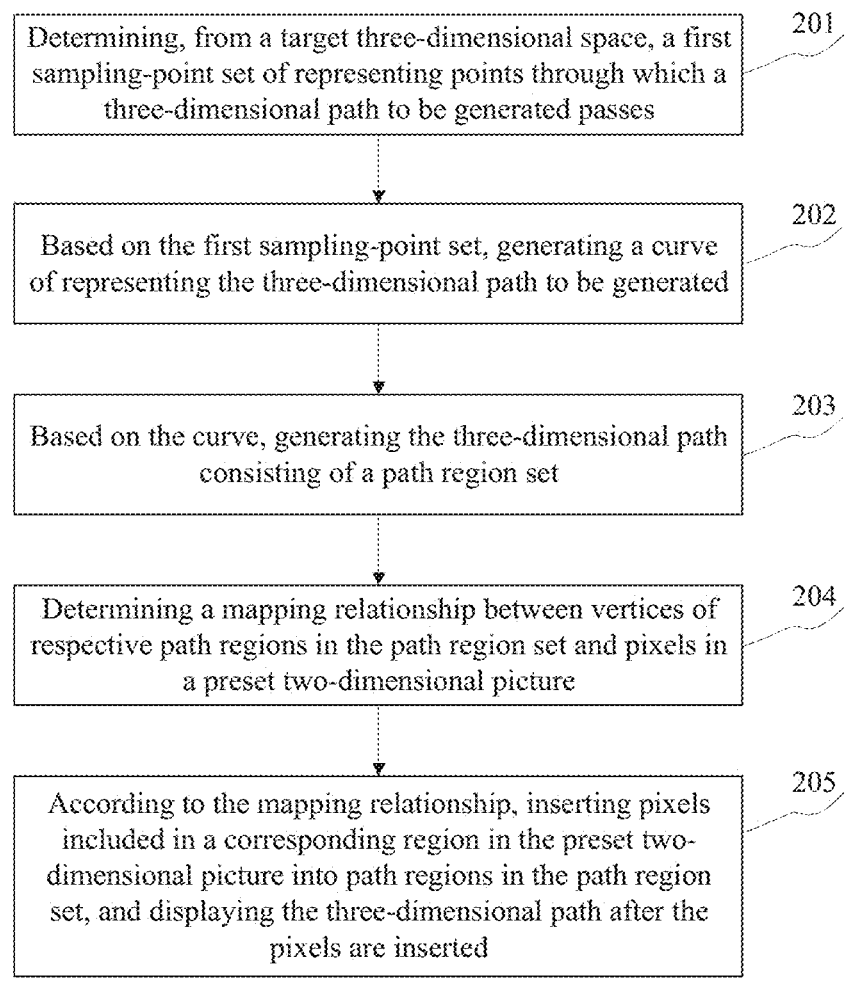
FIG. 2 is a schematic flowchart of a three-dimensional path display method according to one or more embodiments of the present disclosure.

FIG. 2 is a schematic flowchart of a three-dimensional path display method provided by an exemplary embodiment of the present disclosure. An electronic apparatus (e.g., the terminal apparatus 101 or the server 103 shown in FIG. 1) can perform the flowchart of FIG. 2 (e.g., the three-dimensional path display method). As shown in FIG. 2, the method comprises the following steps.

At step 201, the electronic apparatus determines, from a target three-dimensional space, a first sampling-point set of representing points through which the three-dimensional path to be generated passes.

In this embodiment, the electronic apparatus may determine, from the target three-dimensional space, a first sampling-point set of representing points through which the three-dimensional path to be generated passes. Therein, the target three-dimensional space may be a three-dimensional space simulated in the above-mentioned electronic apparatus, and the three-dimensional space may correspond to a real three-dimensional space, such as a space in the room, a space corresponding to a certain road section, an internal space of means of transportation such as vehicles, ships, airplanes, etc. The target three-dimensional space may not correspond to the real three-dimensional space, that is, the target three-dimensional space is a virtual space. The target three-dimensional space is usually represented by a corresponding three-dimensional coordinate system, from which the coordinates of each point in the first sampling-point set can be determined.

The points in the first sampling-point set may be points specified by the user, or points automatically determined by the electronic apparatus according to the specified starting point and ending point. As an example, in a VR (Virtual Reality) house viewing scenario, the target three-dimensional space may include a point of representing a living room, a point of representing a bedroom, a point of representing a bathroom, and the like, which are preset or specified by the user. The electronic apparatus may generate, according to these points, a three-dimensional path from the living room to the bedroom, and then to the bathroom.

At step 202, based on the first sampling-point set, the electronic apparatus generates a curve of representing the three-dimensional path to be generated.

In this embodiment, the electronic apparatus may generate a curve of representing the three-dimensional path to be generated based on the first sampling-point set. Specifically, the electronic apparatus may fit, according to the first sampling points included in the first sampling-point set, a curve as the curve of representing the three-dimensional path to be generated. As an example, the electronic apparatus may use the method CatmullRomCurve3 for generating a smooth curve provided in the existing three-dimensional scenario creation engine THREE.js, to fit a curve of representing a three-dimensional path to be generated.

At step 203, based on the curve, the electronic apparatus generates a three-dimensional path consisting of a path region set.

In this embodiment, the electronic apparatus may generate a three-dimensional path consisting of a path region set based on the curve.

As an example, the electronic apparatus can extend the curve along the horizontal plane to two sides or one side by a set width, so as to obtain a three-dimensional path, and divide the three-dimensional path into multiple meshes or multiple road sections according to a set rule. Each mesh or road section is a path region.

Optionally, the electronic apparatus may, based on the aspect ratio of the preset two-dimensional picture, on the curve, generate a three-dimensional path consisting of the path region set, wherein the path regions in the path region set are quadrilateral regions.

Specifically, the preset quadrilateral width (i.e., the path width, for example, 1 meter) is multiplied by the aspect ratio of the preset two-dimensional picture to obtain a length of each quadrilateral region (corresponding to a height of the two-dimensional picture). Furthermore, the above curve is divided into a plurality of line segments with the same length, and then an endpoint of each line segment is moved along the normal direction by the same distance as the width of the above path, or two endpoints of each line segment are respectively moved along the normal direction and the opposite direction of the normal direction by a distance of half the path width, and finally the moved endpoints are connected, resulting in a three-dimensional path consisting of multiple quadrilateral regions.

By generating a three-dimensional path consisting of multiple quadrilateral regions, and setting the aspect ratio of each quadrilateral region to be the same as the aspect ratio of the preset two-dimensional picture, when inserting a picture into the quadrilateral region subsequently, it is possible to quickly determine a mapping relationship between the quadrilateral region and the preset two-dimensional picture, which improves an efficiency of inserting a picture into the quadrilateral region. Meanwhile, by maintaining an original proportion of the picture when inserting the picture into the quadrilateral region, the display effect of the three-dimensional path is closer to the real scenario.

At step 204, the electronic apparatus determines a mapping relationship between vertices of respective path regions in the path region set and pixels in a preset two-dimensional picture.

In this embodiment, the electronic apparatus may determine a mapping relationship between the vertices of respective path regions in the path region set and the pixels in the preset two-dimensional picture.

For another example, a plurality of (for example, two) path regions may respectively correspond to one region in the preset two-dimensional picture (for example, the preset two-dimensional picture is divided into two parts, and each path region corresponds to a part of the preset two-dimensional picture). According to a positional relationship of multiple path regions, the corresponding part of each path region can be determined in the preset two-dimensional picture, and furthermore, the mapping relationship between the vertices of each path region and the pixels in the preset two-dimensional picture can be determined.

Optionally, when the path region in the path region set is quadrilateral, the electronic apparatus may determine, according to a trend of the curve, the mapping relationship between the four vertices of the respective path regions in the path region set and the corresponding pixels of the four vertices of the preset two-dimensional picture.

Therein, the trend of the curve may be determined according to the starting point and the ending point in the first sampling-point set. As an example, the path region in the path region set may be a rectangular region on a plane, and the aspect ratio of the rectangular region is the same as that of the preset two-dimensional picture. According to the trend of the curve (that is, the trend of the three-dimensional path), a correspondence relationship between the four vertices of the rectangular region and the corresponding pixels of the four vertices of the preset two-dimensional picture can be determined. For example, the front side and the rear side of the rectangular region are determined according to an extension direction of the curve, the front side corresponds to an upper side of the preset two-dimensional picture, and the rear side corresponds to a lower side of the preset two-dimensional picture, and furthermore, the correspondence relationship between the vertices of the rectangular region and corresponding pixels of the vertices of the two-dimensional picture is determined.

When inserting pixels into respective quadrilateral regions subsequently, the mapping relationship between each vertex in the quadrilateral region and the pixel in the preset two-dimensional picture may be determined according to the mapping relationship between the vertex of the quadrilateral and the vertex of the preset two-dimensional picture, thereby completing inserting a two-dimensional picture into the quadrilateral region.

By determining the mapping relationship between the four vertices of the quadrilateral region and the corresponding pixels of the four vertices of the preset two-dimensional picture, when inserting the preset two-dimensional picture into the quadrilateral region, the corresponding pixels of each vertex in the quadrilateral region can be quickly determined, thereby improving the efficiency of displaying three-dimensional paths.

At step 205, according to the mapping relationship, the electronic apparatus inserts pixels included in a corresponding region in the preset two-dimensional picture into path regions in the path region set, and displays the three-dimensional path after the pixels are inserted.

In this embodiment, the electronic apparatus may, according to the mapping relationship, insert the pixels included in the corresponding region in the preset two-dimensional picture into the path region in the path region set, and display the three-dimensional path after the pixels are inserted.

Specifically, after the pixels corresponding to the vertices of the path region are determined, a picture region corresponding to the path region can be determined in the preset two-dimensional picture, wherein the picture region can be an entire region of the preset two-dimensional picture, or a part of the region of the preset two-dimensional picture. And furthermore, after the picture region is zoomed, the pixels included in the zoomed picture region can be inserted into the path region. As for the method of determining the correspondence relationship between the path region and the picture region, reference may be made to an optional embodiment of the present disclosure.

In the three-dimensional path display method described above, the dynamic generation and display of a three-dimensional path in the three-dimensional scenario is realized by the following means: determining, from a target three-dimensional space, a first sampling-point set; and based on the first sampling-point set, generating a curve of representing the three-dimensional path to be generated; and then based on the curve, generating a three-dimensional path consisting of a path region set; and subsequently determining a mapping relationship between vertices included in respective path regions and pixels in a preset two-dimensional picture; and finally, according to the mapping relationship, inserting corresponding pixels into path regions in the path region set, and displaying the three-dimensional path after the pixels are inserted. As compared with the prior art in which it is necessary to manually draw the three-dimensional path, the embodiments of the present disclosure can greatly improve the efficiency of generating a three-dimensional path, and display the three-dimensional path to the user in real time, thereby improving the efficiency and accuracy of the path display.

Figure 3:
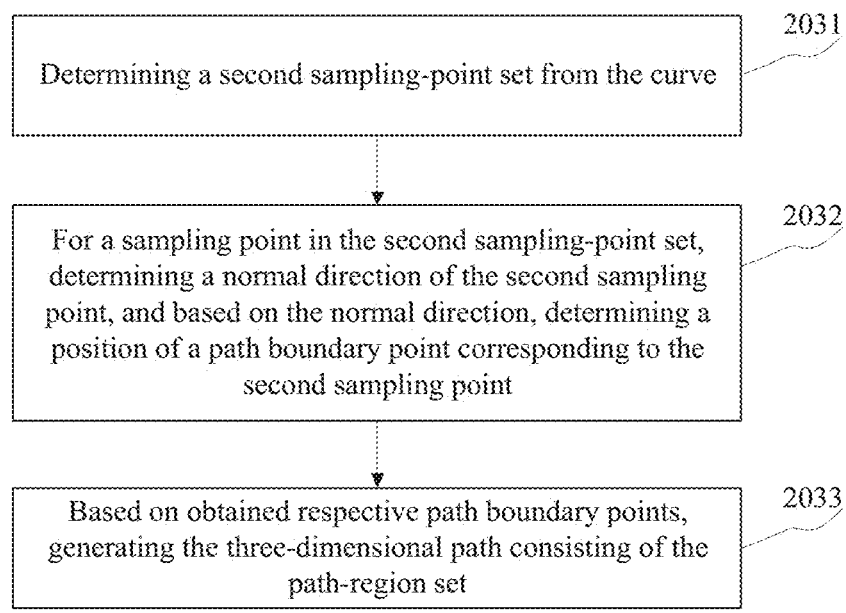
FIG. 3 is another schematic flowchart of a three-dimensional path display method according to one or more embodiments of the present disclosure.

In some optional implementation approaches, as shown in FIG. 3, Step 203 may include the following sub-steps.

At step 2031, the electronic apparatus determines a second sampling-point set from the curve.

Generally, the second sampling-point set can be determined from the curve according to a preset sampling interval (for example, 1 meter).

At step 2032, for a sampling point in the second sampling-point set, the electronic apparatus determines a normal direction of the second sampling point, and based on the normal direction, determining a position of a path boundary point corresponding to the second sampling point.

Therein, the method for determining the normal direction is currently the prior art, and details are not described herein again. The number of path boundary points corresponding to the second sampling point may be one or two. Generally, the position of the path boundary point can be determined according to a set path width. For example, when the second sampling point corresponds to one path boundary point, in the normal direction of the second sampling point, a point whose distance from the second sampling point is the above-mentioned path width may be determined as the path boundary point.

Figure 4:
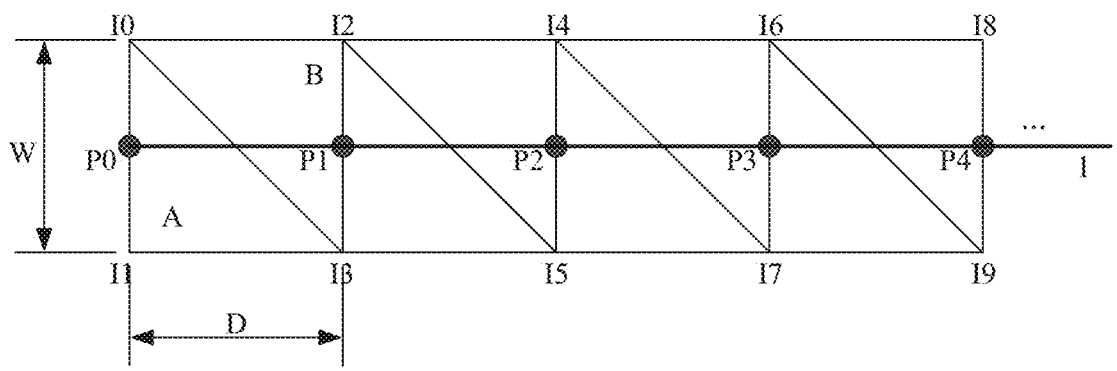
FIG. 4 is an exemplary schematic diagram of a three-dimensional path consisting of a triangular mesh according to one or more embodiments of the present disclosure.

When the second sampling point corresponds to two path boundary points, the two boundary points can be determined in the normal direction of the second sampling point and the opposite direction of the normal line respectively, and the distance between the two boundary points is the above-mentioned path width. Generally, the distances between the two boundary points and the second sampling point can be set to be equal. As shown in FIG. 4, the second sampling points include P0, P1, P2, . . . . Path boundary points include, I0, I1, I2, I3, . . . , therein 1 represents the generated curve. The second sampling point P0 corresponds to the path boundary points I0 and I1, and I0 and I1 are located in the normal direction and the opposite direction of the normal direction of P0, respectively. The relationship between other second sampling points and the path boundary points is shown in the figure.

At step 2033, based on obtained respective path boundary points, the electronic apparatus generates the three-dimensional path consisting of the path region set.

As an example, each path boundary point may be connected in the manner shown in FIG. 4, and the generated path region is a triangle, thereby obtaining a three-dimensional path consisting of triangular meshes. For another example, the path boundary points located on both sides of the second sampling point as shown in FIG. 4 may be connected to obtain a three-dimensional path consisting of rectangular meshes.

In this implementation approach, the path boundary point corresponding to each second sampling point is determined based on the normal direction of each second sampling point, and a three-dimensional path is generated according to the path boundary point, so that the generated three-dimensional path is closer to the real path, and meanwhile, according to the path boundary point, the correspondence relationship between the obtained path region and the preset two-dimensional picture can be more clear, which helps to improve the efficiency and accuracy of pasting pictures to the path region.

In some optional implementation approaches, the above Step 2033 may be performed as follows.

Based on the obtained respective path boundary points, the electronic apparatus generates a triangular mesh as a path region, and obtains a three-dimensional path consisting of a triangular-mesh set.

Therein, a region between adjacent second sampling points in the three-dimensional path consists of two triangular meshes with common vertices. As shown in FIG. 4, P0 and P1 are adjacent second sampling points, and the rectangular region between P0 and P1 consists of Triangle A (vertices are I0, I1, I3) and Triangle B (vertices are I2, I3, I0), points I0 and I3 are common vertices. Assuming i be an index of second sampling points, for example, the index of P0 is 0, and the index of P1 is 1. Then, the two triangles between the adjacent second sampling points can be expressed as i*2+0, i*2+1, i*2+3, and i*2+2, i*2+3, i*2+0. As for N triangles, since there are common vertices, only 2N points are described.

The existing method for pasting pictures based on triangle meshes generally requires 3N points to describe N triangles. Therefore, this implementation approach can use fewer points to describe triangles, which saves the storage space occupied by points that may be stored for describing triangles. In addition, since the three vertices included in the triangle mesh must be in the same plane, by representing the three-dimensional path with the triangle meshes, it is possible to more accurately determine the correspondence relationship between the vertices of the triangle mesh and the pixels in the preset two-dimensional picture when pasting pictures to the triangle mesh, thereby improving the efficiency of displaying three-dimensional paths.

In some optional implementation approaches, in the above step 2032, for the sampling point in the second sampling-point set, the electronic apparatus may determine the position of the path boundary point corresponding to the second sampling point according to the following steps.

Firstly, the electronic apparatus determines a path width corresponding to the second sampling point based on an aspect ratio of the preset two-dimensional picture and a distance between adjacent second sampling points in the second sampling-point set.

Therein, the above-mentioned preset two-dimensional picture and the preset two-dimensional picture in Step 204 are the same picture. As an example, the aspect ratio of the preset two-dimensional picture is r, and assuming the distance between adjacent second sampling points be D, the path width is r*D.

Then, based on the path width and the normal direction, the electronic apparatus determines the position of the path boundary point corresponding to the second sampling point.

As an example, one path boundary point may be determined in the normal direction, and the distance between the path boundary point and the second sampling point is the above-mentioned path width.

Figure 5A:
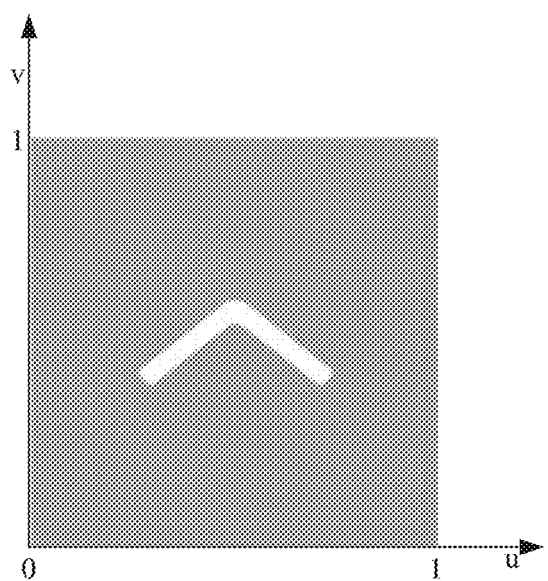
FIG. 5A is an exemplary schematic diagram of a preset two-dimensional picture according to one or more embodiments of the present disclosure.
Figure 5B:
FIG. 5B is an exemplary schematic diagram of a three-dimensional path display picture according to one or more embodiments of the present disclosure.

In this implementation approach, by determining the path width based on the aspect ratio of the preset two-dimensional picture, the rectangular region between two adjacent second sampling points can be made equal proportional to the preset two-dimensional picture, so that when pasting pictures to the path region, the inserted preset two-dimensional picture is maintained in the original ratio, and thus the display effect of the three-dimensional path matches the real three-dimensional scenario. It should be noted that the rectangular region is in the three-dimensional space, and the equal proportion to the rectangular region and the preset two-dimensional picture is also effects in the three-dimensional space. When displaying the three-dimensional path, since the display window is two-dimensional, the appearance of the displayed pasting-picture is not proportional to the preset two-dimensional picture when the three-dimensional path is mapped to the display window. FIG. 5A shows a preset two-dimensional picture with a square shape. In the three-dimensional path display picture shown in FIG. 5B, the preset two-dimensional picture inserted in the three-dimensional path has a three-dimensional display effect.

In some optional implementation approaches, for the sampling point in the second sampling-point set, the electronic apparatus may determine, based on the path width and the normal direction, the position of the path boundary point corresponding to the second sampling point according to the following steps.

Based on the path width, determining two path boundary points with the same distance from the second sampling point respectively in the normal direction of the second sampling point and an opposite direction of the normal line. As shown in FIG. 4, W represents the path width, the path boundary point I0 is located in the normal direction of P0, and the path boundary point I1 is located in the opposite direction of the normal line of P0. For the path boundary points I0 and I1, the two distances from the second sampling point P0 are W/2.

In this implementation approach, path boundary points with the same distance from the second sampling point are respectively disposed in the normal direction of the second sampling point and in the opposite direction of the normal, so that the three-dimensional path can be better matched with the generated curve, which improves the accuracy of the generated three-dimensional path.

Figure 6:
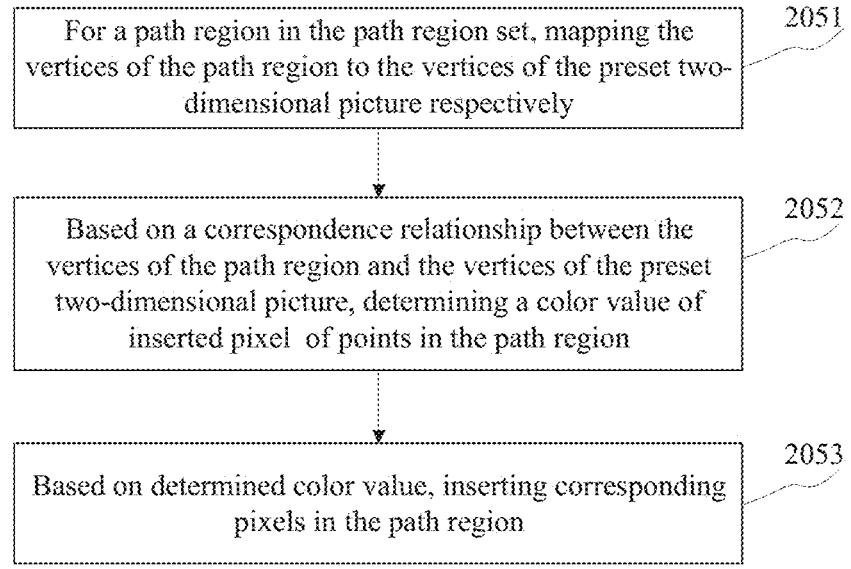
FIG. 6 is a schematic flowchart of a three-dimensional path display method according to one or more embodiments of the present disclosure.

In some optional implementation approaches, as shown in FIG. 6, Step 205 may include the following sub-steps.

At step 2051, for a path region in the path region set, the electronic apparatus maps the vertices of the path region to the vertices of the preset two-dimensional picture respectively.

As an example, as shown in FIG. 4, for the triangular path region A, when determining the mapping relationship between the triangular path region A and the preset two-dimensional picture, it may be described with Attribute uv of the two-dimensional picture. Attribute uv means that the horizontal direction of the preset two-dimensional picture is represented by Coordinate u, and the vertical direction is represented by Coordinate v. As shown in FIG. 5A, when the coordinate of uv is (0, 0), it is mapped to the lower left corner of the preset two-dimensional picture. Similarly, if the coordinate of uv is (1, 1), it will be mapped to the upper right corner of the preset two-dimensional picture. In the case of a three-dimensional path consisting of multiple triangles, the distance between each second sampling point and the starting point of the three-dimensional path and the distance D between the two adjacent second sampling points can be performed a modulo operation, and furthermore, the corresponding vertex of Coordinate u can be determined.

For example, for the second sampling point P0 in FIG. 4, the distance between this point and the starting point is 0, the modulo operation is performed with D, and 0/D=0 is obtained, then the coordinates of uv corresponding to the vertices I0, I1, and I3 are (0, 1), (0, 0), (1, 0), the coordinates of uv corresponding to vertices I2, I3, and I0 are (1, 1), (1, 0), (0, 1) respectively.

For the second sampling point P1, the distance between this point and the starting point is D, the modulo operation is performed with D, and D/D=1 is obtained, then the coordinates of corresponding to the vertices I2, I3, and I5 are (0, 1), (0, 0), (1, 0), the coordinates of uv corresponding to vertices I4, I5, and I2 are (1, 1), (1, 0), (0, 1), respectively. By analogy, the correspondence relationship between the vertices of other triangular path regions and the vertices of the preset two-dimensional picture can be determined.

At step 2052, based on a correspondence relationship between the vertices of the path region and the vertices of the preset two-dimensional picture, the electronic apparatus determines a color value of inserted pixel of points in the path region.

Specifically, after determining the correspondence relationship between the vertices of the path region and the vertices of the preset two-dimensional picture, the path region and corresponding region in the preset two-dimensional picture can be determined, so that pixels can be inserted into the path region.

At step 2053, based on determined color value, the electronic apparatus inserts corresponding pixels in the path region.

In this implementation approach, the corresponding relationship between the vertices of the path region and the vertices of the preset two-dimensional picture is determined, and the corresponding pixels in the preset two-dimensional picture are inserted according to the corresponding relationship, so that the two-dimensional picture can be accurately filled into the three-dimensional path, thereby improving the accuracy of displaying three-dimensional paths.

Exemplary Device

Figure 7:
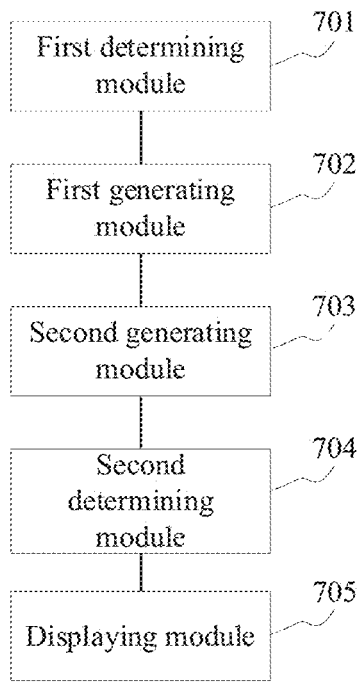
FIG. 7 is a schematic diagram of a structure of a three-dimensional path display device according to one or more embodiments of the present disclosure.

FIG. 7 is a schematic diagram of a structure of a three-dimensional path display device provided by an exemplary embodiment of the present disclosure. This embodiment can be applied to an electronic apparatus. As shown in FIG. 7, the three-dimensional path display device comprises: a first determining module 701, configured to determine, from a target three-dimensional space, a first sampling-point set of representing points through which a three-dimensional path to be generated passes; a first generating module 702, configured to generate a curve of representing the three-dimensional path to be generated based on the first sampling-point set; a second generating module 703, configured to, based on the curve, generate a three-dimensional path consisting of a path region set; a second determining module 704, configured to determine a mapping relationship between vertices of respective path regions in the path region set and pixels in a preset two-dimensional picture; and a displaying module 705, configured to, according to the mapping relationship, insert pixels included in a corresponding region in the preset two-dimensional picture into path regions in the path region set, and display the three-dimensional path after the pixels are inserted.

In this embodiment, the first determining module 701 can determine, from a target three-dimensional space, a first sampling-point set of representing points through which a three-dimensional path to be generated passes. Therein, the target three-dimensional space may be a three-dimensional space simulated in the above-mentioned device, and the three-dimensional space may correspond to a real three-dimensional space, such as a space in the room, a space corresponding to a certain road section, an internal space of means of transportation such as vehicles, ships, airplanes, etc. The target three-dimensional space may not correspond to the real three-dimensional space, that is, a virtual space. The target three-dimensional space is generally represented by a corresponding three-dimensional coordinate system, from which the coordinates of each point in the first sampling-point set can be determined.

The points in the first sampling-point set may be points specified by the user, or points automatically determined by the first determining module 701 according to the specified starting point and ending point. As an example, in a VR (Virtual Reality) house viewing scenario, the target three-dimensional space may include a point of representing a living room, a point of representing a bedroom, a point of representing a bathroom, and the like, which are preset or specified by the user. The first determining module 701 may generate a three-dimensional path from the living room to the bedroom, and then to the bathroom according to these points.

In this embodiment, the first generating module 702 can generate a curve of representing the three-dimensional path to be generated based on the first sampling-point set. Specifically, the first generating module 702 may fit, according to the first sampling points included in the first sampling-point set, a curve as the curve of representing the three-dimensional path to be generated. As an example, the first generating module 702 may use the method CatmullRom-Curve3 for generating a smooth curve provided in the existing three-dimensional scenario creation engine THREE.js, to fit a curve of representing a three-dimensional path to be generated.

In this embodiment, the second generating module 703 can, based on the curve, generate a three-dimensional path consisting of a path region set. As an example, the second generating module 703 can extend the curve along the horizontal plane to two sides or one side by a set width, so as to obtain a three-dimensional path, and divide the three-dimensional path into multiple meshes or multiple road sections according to a set rule. Each mesh or road section is a path region.

In this embodiment, the second determining module 704 can determine a mapping relationship between vertices of respective path regions in the path region set and pixels in a preset two-dimensional picture.

As an example, the path region in the path region set may be a rectangular region on a plane, and the aspect ratio of the rectangular region is the same as that of the preset two-dimensional picture. According to the trend of the three-dimensional path, the correspondence relationship between the four vertices of the rectangular region and the corresponding pixels of the four vertices of the preset two-dimensional picture can be determined. For example, the front side and the rear side in the rectangular region are determined according to the trend of the three-dimensional path, the front side corresponds to an upper side of the preset two-dimensional picture, and the rear side corresponds to a lower side of the preset two-dimensional picture, and furthermore, the correspondence relationship between the vertices of the rectangular region and corresponding pixels of the vertices of the two-dimensional picture is determined.

For another example, a plurality of (for example, two) path regions may respectively correspond to one region in the preset two-dimensional picture (for example, the preset two-dimensional picture is divided into two parts, and each path region corresponds to a part, of the preset two-dimensional picture). According to a positional relationship of multiple path regions, the corresponding part of each path region can be determined in the preset two-dimensional picture, and furthermore, the mapping relationship between the vertices of each path region and the pixels in the preset two-dimensional picture can be determined.

In this embodiment, the displaying module 705 can, according to the mapping relationship, insert pixels included in a corresponding region in the preset two-dimensional picture into path regions in the path region set, and display the three-dimensional path after the pixels are inserted.

Specifically, after the pixels corresponding to the vertices of the path region are determined, a picture region corresponding to the path region can be determined in the preset two-dimensional picture, wherein the picture region can be an entire region of the preset two-dimensional picture, or a part of the region of the preset two-dimensional picture. And furthermore, after the picture region is zoomed, the pixels included in the zoomed picture region can be inserted into the path region. As for the method of determining the correspondence relationship between the path region and the picture region, reference may be made to an optional embodiment of the present disclosure.

Figure 8:
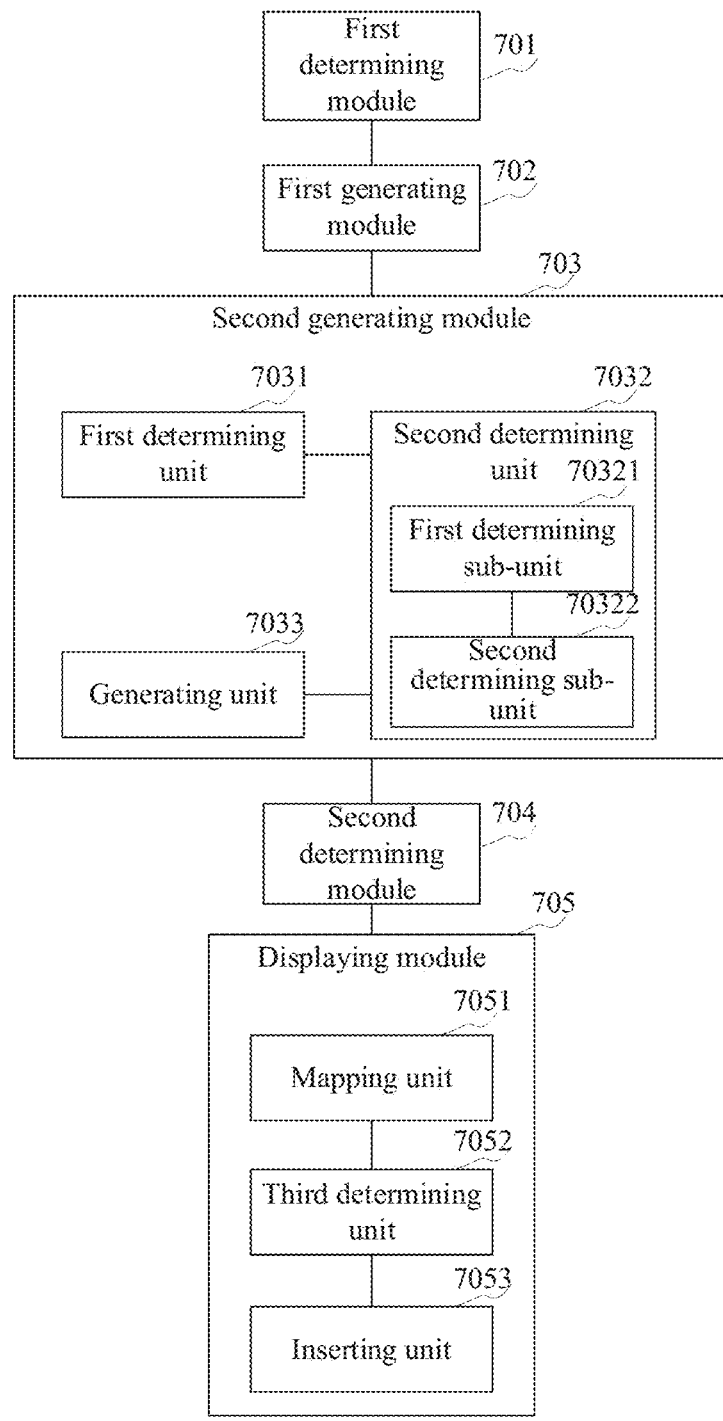
FIG. 8 is a schematic diagram of a structure of a three-dimensional path display device according to one or more embodiments of the present disclosure.

Referring to FIG. 8, FIG. 8 is a schematic diagram of a structure of a three-dimensional path display device provided by another exemplary embodiment of the present disclosure.

In some optional implementation approaches, the second generating module 703 comprises: a first determining unit 7031, configured to determine a second sampling-point set from the curve; a second determining unit 7032, configured to, for a sampling point in the second sampling-point set, determine a normal direction of the second sampling point, and based on the normal direction, determine a position of a path boundary point corresponding to the second sampling point; a generating unit 7033, configured to, based on the obtained respective path boundary points, generate a three-dimensional path consisting of a path region set.

In some optional implementation approaches, the generating unit 7033 is further configured to: based on the obtained respective path boundary points, generate a triangular mesh as a path region, and obtain a three-dimensional path consisting of a triangular-mesh set, wherein a region between adjacent second sampling points in the three-dimensional path consists of two triangular meshes with common vertices.

In some optional implementation approaches, the second determining unit 7032 comprises: a first determining sub-unit 70321, configured to determine a path width corresponding to the second sampling point based on an aspect ratio of the preset two-dimensional picture and a distance between adjacent second sampling points in the second sampling-point set; and a second determining sub-unit 70322, configured to, based on the path width and the normal direction, determine the position of the path boundary point corresponding to the second sampling point.

In some optional implementation approaches, the second determining sub-unit 70322 is further configured to, based on the path width, determine two path boundary points with an equal distance from the second sampling point respectively in the normal direction of the second sampling point and an opposite direction of the normal line.

In some optional implementation approaches, the second generating module 703 may be further configured to, based on the aspect ratio of the preset two-dimensional picture, on the curve, generate a three-dimensional path consisting of the path region set, wherein the path regions in the path region set are quadrilateral regions.

In some optional implementation approaches, the second determining module 704 may be further configured to, according to a trend of the curve, determine the mapping relationship between the four vertices of respective path regions with quadrilateral shape in the path region set and the corresponding pixels of the four vertices of the preset two-dimensional picture.

In some optional implementation approaches, the displaying module 705 comprises: a mapping unit 7051, configured to, for a path region in the path region set, map the vertices of the path region to the vertices of the preset two-dimensional picture respectively; a third determining unit 7052, configured to, based on a correspondence relationship between the vertices of the path region and the vertices of the preset two-dimensional picture, determine a color value of inserted pixel of points in the path region; and an inserting unit 7053, configured to, based on determined color value, insert corresponding pixels in the path region.

In the three-dimensional path display device provided by the above-mentioned embodiments of the present disclosure, the dynamic generation and display of a three-dimensional path in the three-dimensional scenario is realized by the following means: determining, from a target three-dimensional space, a first sampling-point set; and based on the first sampling-point set, generating a curve of representing the three-dimensional path to be generated; and then based on the curve, generating a three-dimensional path consisting of a path region set; and subsequently determining a mapping relationship between vertices of respective path regions and pixels in a preset two-dimensional picture; and finally, according to the mapping relationship, inserting corresponding pixels into path regions in the path region set, and displaying the three-dimensional path after the pixels are inserted. As compared with the prior art in which it is necessary to manually draw the three-dimensional path, the embodiments of the present disclosure can greatly improve the efficiency of generating a three-dimensional path, and display the three-dimensional path to the user in real time, which improves the efficiency and accuracy of the path display.

Exemplary Electronic Apparatus

Hereinafter, an electronic apparatus according to an embodiment of the present disclosure will be described with reference to FIG. 9. The electronic apparatus may be any one or both of the terminal apparatus 101 and the server 103 as shown in FIG. 1, or a stand-alone apparatus independent of them, and the stand-alone apparatus may communicate with the terminal apparatus 101 and the server 103 so as to receive the collected input signals from them.

Figure 9:
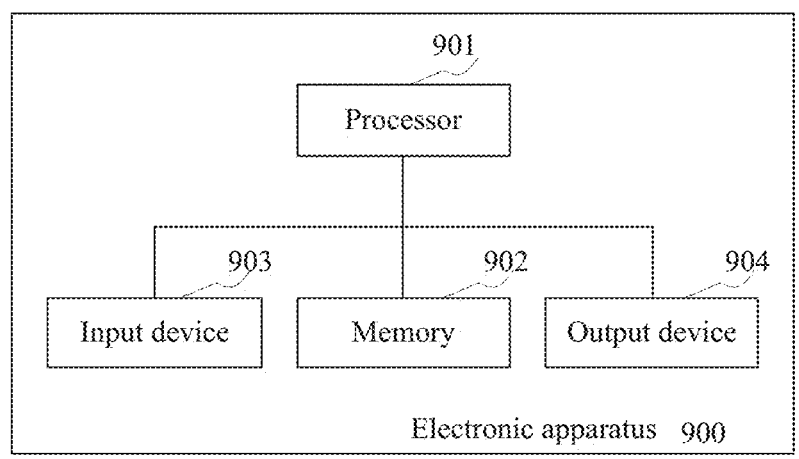
FIG. 9 is a structural diagram of an electronic apparatus according to one or more embodiments of the present disclosure.

FIG. 9 is a block diagram of an electronic apparatus provided by an exemplary embodiment of the present disclosure.

As shown in FIG. 9, the electronic apparatus 900 comprises one or more processors 901 and a memory 902.

The processor 901 may be a central processing unit (CPU) or other forms of processing units having data processing capabilities and/or instruction execution capabilities, and may control other components in the electronic apparatus 900 so as to perform desired functions.

The memory 902 may include one or more computer program products, which may include various forms of computer-readable storage media, such as volatile memory and/or non-volatile memory. Volatile memory may include, for example, random access memory (RAM) and/or cache Non-volatile memory may include, for example, read only memory (ROM), hard disk, flash memory, and the like. One or more computer program instructions may be stored on the computer-readable storage medium, and the processor 901 may execute the program instructions so as to implement the three-dimensional path display method of the various embodiments of the present disclosure mentioned above and/or other desired functions. Various contents such as the first sampling-point set, the second sampling-point set, and the like may further be stored in the computer-readable storage medium.

In one example, the electronic apparatus 900 may further include an input device 903 and an output device 904, and these components are interconnected by a bus system and/or other form of connection mechanism (not shown).

For example, when the electronic apparatus is the terminal apparatus 101 or the server 103, the input device 903 may be a camera, a mouse, a keyboard, etc., which is configured to input three-dimensional space data, a sampling point set, and the like. When the electronic apparatus is a stand-alone apparatus, the input device 903 may be a communication network connector, which is configured to receive the input three-dimensional space data, sampling-point set, etc. from the terminal apparatus 101 and the server 103.

The output device 904 can output various information to the outside, including three-dimensional paths. The output devices 904 may include, for example, displays, speakers, printers, and communication networks, and their connected remote output devices, etc.

Definitely, for simplicity, only some of the components in the electronic apparatus 900 related to the present disclosure are shown in FIG. 9, in which components such as buses, input/output interfaces, and the like are omitted. Besides, the electronic apparatus 900 may further include any other suitable components according to the specific application.

Exemplary Computer Program Product and Computer-Readable Storage Medium

In addition to the method and apparatuses described above, embodiments of the present disclosure may further be a computer program product, comprising computer program instructions. When the computer program instructions are executed by a processor, the processor performs steps in the three-dimensional path display method according to various embodiments of the present disclosure described above in the part of the "Exemplary Method" of this description.

The computer program product may write program code for performing operations of embodiments of the present disclosure in any combination of one or more programming languages, and these programming languages include object-oriented programming languages, such as JAVA, C++, etc., further includes conventional procedural programming languages, such as "C" language or similar programming languages. The program code may execute entirely on the user computing apparatus, partly on the user apparatus, as a stand-alone software package, partly on the user computing apparatus and partly on a remote computing apparatus, entirely on the remote computing apparatus, or server.

In addition, embodiments of the present disclosure may further be a computer-readable storage medium having computer program instructions stored thereon. When the computer program instructions are executed by a processor, the processor performs steps in the three-dimensional path display method according to various embodiments of the present disclosure described above in the part of the "Exemplary Method" of this description.

The computer-readable storage medium may adopt any combination of one or more readable media. The readable medium may be a readable signal medium or a readable storage medium. The readable storage medium may include, for example, but not limited to, electrical, magnetic, optical, electromagnetic, infrared, or semiconductor systems, devices or equipment, or any combination of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any above-mentioned suitable combination.

Exemplary Computer Program

Embodiments of the present disclosure further provide a computer program product, including computer programs/instructions. When the computer program/instructions are executed by a processor, the three-dimensional path display method in any of the above-mentioned possible implementation approaches can be implemented.

The computer program product can be specifically implemented by hardware, software or a combination thereof. In an optional example, the computer program product is embodied as a computer storage medium, and in another optional example, the computer program product is embodied as a software product, such as a software development kit (SDK) and the like.

The basic principles of the present disclosure have been described above with combination with specific embodiments. However, it should be pointed out that the advantages, superiorities, effects, etc. mentioned in the present disclosure are only examples rather than limitations, and these advantages, superiorities, effects, etc. should not be considered to be a must-have for each embodiment of the present disclosure. In addition, the specific details disclosed above are only for the purpose of example and easy understanding, but not for limitation, and the above details do not limit the present disclosure to be implemented by using the above specific details.

The various embodiments in this description are described in a progressive manner, and each embodiment focuses on the differences from other embodiments, and the same or similar parts between the various embodiments may be referred to each other. As for embodiments of the system, since it basically corresponds to the method embodiment, the description is relatively simple, and for related parts, reference is made to the partial description of embodiments of the method.

The block diagrams of equipment, devices, apparatuses, and systems referred to in the present disclosure are merely illustrative examples and are not intended to require or imply that the connections, arrangements, or configurations must be in the manner shown in the block diagrams. As those skilled in the art will appreciate, these equipment, devices, apparatuses, and systems may be connected, arranged, configured in any manner. Words such as "including", "comprising", "having" and the like are open-ended words, which mean "including but not limited to" and are used interchangeably therewith. As used herein, the words "or" and "and" refer to and are used interchangeably with the word "and/or", unless the context clearly dictates otherwise. As used herein, the word "such as" refers to and is used interchangeably with the phrase "such as but not limited to".

The methods and devices of the present disclosure may be implemented in many ways. For example, the methods and devices of the present disclosure may be implemented in software, hardware, firmware, or any combination of software, hardware, and firmware. The above-described order of steps for the method is for illustration only, and the steps of the method of the present disclosure are not limited to the order specifically described above, unless specifically stated otherwise. Furthermore, in some embodiments, the present disclosure can further be implemented as programs recorded in a recording medium, the programs include machine-readable instructions for implementing methods according to the present disclosure. Thus, the present disclosure further covers a recording medium storing a program for executing the method according to the present disclosure.

It should further be noted that, in the device, apparatus and method of the present disclosure, each component or each step may be decomposed and/or recombined. These decomposition and/or recombination should be considered equivalents of the present disclosure.

The above description of the disclosed aspects is provided to enable any those skilled in the art to make or use the present disclosure. Various modifications to these aspects will be readily apparent to those skilled in the art, and the generic principles defined herein may be applied to other aspects without departing from the scope of the present disclosure. Thus, the present disclosure is not intended to be limited to the aspects shown herein but is to be accorded the widest scope consistent with the principles and novel features disclosed herein.

The foregoing description has been presented for the purposes of illustration and description. Furthermore, this description is not intended to limit embodiments of the present disclosure to the forms disclosed herein. Although a number of example aspects and embodiments have been discussed above, those skilled in the art will recognize certain variations, modifications, changes, additions and sub-combinations thereof.

What is claimed is:

1. A three-dimensional path display method, comprising:
   determining, from a target three-dimensional space, a first sampling-point set comprising points;
   based on the first sampling-point set, generating a curve indicating a three-dimensional path to be generated;
   determining a second sampling-point set from the curve;
   determining a normal direction of a second sampling point from the second sampling-point set;
   determining a path width corresponding to the second sampling point based on an aspect ratio of a preset two-dimensional picture and a distance between adjacent second sampling points in the second sampling-point set;
   based on the path width and the normal direction, determining a position of a path boundary point corresponding to the second sampling point;
   based on obtained respective path boundary points, generating the three-dimensional path comprising a path region set, wherein the three-dimensional path passes through the points of the first sampling-point set;
   determining a mapping relationship between vertices of respective path regions in the path region set and pixels in the preset two-dimensional picture;
   according to the mapping relationship, inserting pixels included in a corresponding region in the preset two-dimensional picture into path regions in the path region set; and
   displaying the three-dimensional path after the pixels are inserted.

2. The method according to claim 1, wherein generating the three-dimensional path comprising the path region set comprises:
   based on the obtained respective path boundary points, generating a triangular mesh as a path region; and
   obtaining the three-dimensional path comprising a triangular-mesh set, wherein a region between the adjacent second sampling points in the three-dimensional path comprises two triangular meshes with common vertices.

3. The method according to claim 1, wherein determining the position of the path boundary point corresponding to the second sampling point comprises:
   based on the path width, determining two path boundary points with a same distance from the second sampling point respectively in the normal direction of the second sampling point and an opposite direction of a normal line.

4. The method according to claim 1, wherein generating the three-dimensional path comprising the path region set comprises:
   based on the aspect ratio of the preset two-dimensional picture, on the curve, generating the three-dimensional path comprising the path region set, wherein the path regions in the path region set are quadrilateral regions.

5. The method according to claim 4, wherein determining the mapping relationship between the vertices of respective path regions in the path region set and the pixels in the preset two-dimensional picture comprises:
   according to a trend of the curve, determining the mapping relationship between the four vertices of respective path regions with quadrilateral shape in the path region set and the corresponding pixels of the four vertices of the preset two-dimensional picture.

6. The method according to claim 1, wherein inserting the pixels into the path regions in the path region set comprises:
   for a path region in the path region set, mapping the vertices of the path region to the vertices of the preset two-dimensional picture respectively;
   based on a correspondence relationship between the vertices of the path region and the vertices of the preset two-dimensional picture, determining a color value of inserted pixel of points in the path region; and
   based on the determined color value, inserting corresponding pixels in the path region.

7. A three-dimensional path display device, comprising:
   one or more processors; and
   a non-transitory computer-readable medium, having computer-executable instructions stored thereon, the computer-executable instructions, when executed by the one or more processors, facilitate:
      determining, from a target three-dimensional space, a first sampling-point set comprising points;
      based on the first sampling-point set, generating a curve indicating a three-dimensional path to be generated;
      determining a second sampling-point set from the curve;
      determining a normal direction of a second sampling point from the second sampling-point set;
      determining a path width corresponding to the second sampling point based on an aspect ratio of a preset two-dimensional picture and a distance between adjacent second sampling points in the second sampling-point set;
      based on the path width and the normal direction, determining a position of a path boundary point corresponding to the second sampling point;
      based on obtained respective path boundary points, generating the three-dimensional path comprising a path region set, wherein the three-dimensional path passes through the points of the first sampling-point set;
      determining a mapping relationship between vertices of respective path regions in the path region set and pixels in the preset two-dimensional picture;

according to the mapping relationship, inserting pixels included in a corresponding region in the preset two-dimensional picture into path regions in the path region set; and displaying the three-dimensional path after the pixels are inserted.

8. The three-dimensional path display device according to claim 7, wherein generating the three-dimensional path comprising the path region set comprises:

based on the obtained respective path boundary points, generating a triangular mesh as a path region; and obtaining the three-dimensional path comprising a triangular-mesh set, wherein a region between the adjacent second sampling points in the three-dimensional path comprises two triangular meshes with common vertices.

9. The three-dimensional path display device according to claim 7, wherein determining the position of the path boundary point corresponding to the second sampling point comprises:

based on the path width, determining two path boundary points with a same distance from the second sampling point respectively in the normal direction of the second sampling point and an opposite direction of a normal line.

10. The three-dimensional path display device according to claim 7, wherein generating the three-dimensional path comprising the path region set comprises:

based on the aspect ratio of the preset two-dimensional picture, on the curve, generating the three-dimensional path comprising the path region set, wherein the path regions in the path region set are quadrilateral regions.

11. The three-dimensional path display device according to claim 10, wherein determining the mapping relationship between the vertices of respective path regions in the path region set and the pixels in the preset two-dimensional picture comprises:

according to a trend of the curve, determining the mapping relationship between the four vertices of respective path regions with quadrilateral shape in the path region set and the corresponding pixels of the four vertices of the preset two-dimensional picture.

12. The three-dimensional path display device according to claim 7, wherein inserting the pixels into the path regions in the path region set comprises:

for a path region in the path region set, mapping the vertices of the path region to the vertices of the preset two-dimensional picture respectively;

based on a correspondence relationship between the vertices of the path region and the vertices of the preset two-dimensional picture, determining a color value of inserted pixel of points in the path region; and based on the determined color value, inserting corresponding pixels in the path region.

13. A non-transitory computer-readable medium, having computer-executable instructions stored thereon, the computer-executable instructions, when executed by one or more processors, facilitate:

determining, from a target three-dimensional space, a first sampling-point set comprising points;

based on the first sampling-point set, generating a curve indicating a three-dimensional path to be generated;

determining a second sampling-point set from the curve;

determining a normal direction of a second sampling point from the second sampling-point set;

determining a path width corresponding to the second sampling point based on an aspect ratio of a preset two-dimensional picture and a distance between adjacent second sampling points in the second sampling-point set;

based on the path width and the normal direction, determining a position of a path boundary point corresponding to the second sampling point;

based on obtained respective path boundary points, generating the three-dimensional path comprising a path region set, wherein the three-dimensional path passes through the points of the first sampling-point set;

determining a mapping relationship between vertices of respective path regions in the path region set and pixels in the preset two-dimensional picture;

according to the mapping relationship, inserting pixels included in a corresponding region in the preset two-dimensional picture into path regions in the path region set; and displaying the three-dimensional path after the pixels are inserted.

14. The non-transitory computer-readable medium according to claim 13, wherein generating the three-dimensional path comprising the path region set comprises:

based on the obtained respective path boundary points, generating a triangular mesh as a path region; and obtaining the three-dimensional path comprising a triangular-mesh set, wherein a region between the adjacent second sampling points in the three-dimensional path comprises two triangular meshes with common vertices.

* * * * *